US005123253A

United States Patent [19]
Hanson et al.

[11] Patent Number: 5,123,253
[45] Date of Patent: Jun. 23, 1992

[54] METHOD OF OPERATING A TRANSPORT REFRIGERATION UNIT

[75] Inventors: Jay L. Hanson, Bloomington; Romuald M. Jurewicz, St. Louis Park, both of Minn.

[73] Assignee: Thermo King Corporation, Minneapolis, Minn.

[21] Appl. No.: 723,464

[22] Filed: Jul. 11, 1991

[51] Int. Cl.$^5$ ............................................. G05D 23/00
[52] U.S. Cl. ........................................... 62/89; 62/127; 236/94; 324/503
[58] Field of Search ............................ 62/126, 127, 89; 236/94; 165/11.1; 324/503, 825, 16; 340/517

[56] References Cited

U.S. PATENT DOCUMENTS

| | | | |
|---|---|---|---|
| 4,262,736 | 4/1981 | Gilkeson et al. | 236/94 X |
| 4,295,129 | 10/1981 | Cade | 236/94 X |
| 4,387,578 | 6/1983 | Paddock | 236/94 X |
| 4,663,725 | 5/1987 | Truckenbrod et al. | 364/505 |
| 4,857,918 | 8/1989 | Nukushina et al. | 340/825.16 X |
| 4,918,932 | 4/1990 | Gustafson et al. | 62/89 |

*Primary Examiner*—William E. Wayner
*Attorney, Agent, or Firm*—D. R. Lackey

[57] ABSTRACT

A method of operating a transport refrigeration unit having electrical control which includes a display, including the steps of detecting the occurrence of predetermined events in the transport refrigeration unit, and classifying at least certain of them into first, second and third categories of fault conditions, and into a fourth category related to maintenance associated events. When a first category fault occurs, the unit is shut down, a visual alarm is flashed, and the nature of the fault is immediately identified. When a second category fault occurs, a visual alarm is steadily energized, and the nature of the fault if immediately identified. When third category faults and fourth category events occur, they are stored and periodically displayed, with the display respectively identifying the nature of the fault and the type of maintenance event.

7 Claims, 13 Drawing Sheets

| RAM MAP 230 ||||
|---|---|---|---|
| ALSH | ALCH | ALLOG | ALGA |
| FCRNK | DMPC | DMPC | RUNT |
| FSTRT | GLPG | GLPG | (& OTHER |
| HPCO | HGC | HGC | MAINTENANCE |
| OPS | HSA | HSA | RELATED |
| RDFL | HTC | HTC | ALARMS) |
| RUNF | MODC | MODC | |
| | SRC | SRC | |
| | BATLM | CSF | |
| | CSLIM | GLOPL | |
| | DAF | RPMF | |
| | RAF | URDA | |
| | RRLM | WTSF | |
| | SENCL | | |

METHOD OF OPERATING A TRANSPORT REFRIGERATION UNIT

TECHNICAL FIELD

The invention relates in general to transport refrigeration units, and more specifically to transport refrigeration units which have microprocessor based electrical control.

BACKGROUND ART

U.S. Pat. No. 4,663,725, which is assigned to the same assignee as the present application, discloses the use of microprocessor based transport refrigeration control for use with a refrigerated container. Faults are detected during the operation of the refrigeration unit, and a fault manager classifies each fault as being either a shutdown response or a non-shutdown response. An alarm display provides alarm indications.

While this patent adequately handles alarms which can damage the refrigeration system or a perishable load, it would be desirable, and it is an object of the present invention, to provide a new and improved method of handling alarm situations in a transport refrigeration unit which expands upon and improves the methods of the aforesaid patent.

SUMMARY OF THE INVENTION

Briefly, the present invention is a method of operating a transport refrigeration unit which has microprocessor based electrical control for controlling the temperature of a conditioned space to a selected set point temperature. The method includes the steps of detecting the occurrence of predetermined events in the transport refrigeration unit, and classifying the events into at least first, second and third categories of unit fault conditions.

The refrigeration unit is shut down when a first category fault condition occurs, a visual alarm indicator is flashed, and the nature of the fault is displayed with a code which notifies the operator the cause of shutdown. Faults which threaten damage to the refrigeration unit and/or the load being conditioned, are placed in the first category, and shutdown of refrigeration unit occurs immediately along with a warning to the operator and a message as to what caused the shutdown.

Second category fault conditions are those which will not harm the refrigeration unit or the load being condition, but second category fault conditions are serious enough that the operator should be immediately advised. The occurrence of a second category fault condition causes the visual alarm indicator to be continuously energized, instead of being flashed on and off, and a fault code is displayed to identify the nature of the fault.

Third category faults are those which are not serious enough to shut the refrigeration unit down, and they are not serious enough to notify the operator immediately upon occurrence. A third category fault condition is stored or logged in memory at the time of occurrence, and the nature of all such stored third category fault conditions are displayed for a predetermined period of time upon the occurrence of a predetermined event, such as when the refrigeration unit is first turned on. The operator can then decide whether or not to seek maintenance help at once to correct the fault condition, or to wait until the refrigeration unit is at a location where maintenance is available or convenient. Such third category faults may also be down loaded by maintenance personnel to a hand-held tool at the time of routine maintenance.

In a preferred embodiment of the invention, a fourth category is provided for detected events which relate to maintenance of the unit, such as a running timer reaching a predetermined value which indicates that some sort of maintenance is due on the engine, compressor, or other part of the refrigeration system. Fourth category alarms are stored at the time of occurrence, and they are displayed in the same manner described relative to third category faults. Fourth category faults cannot be cleared by the operator, as can the other alarm categories, so that maintenance personnel will know about the maintenance required. Fourth category faults can only be cleared by entering a predetermined code.

BRIEF DESCRIPTION OF THE DRAWINGS

The invention will become more apparent by reading the following detailed description in conjunction with the drawings, which are shown by way of example only, wherein:

FIG. 3 is a RAM map illustrating the classification of alarms according to the teachings of the invention;

DESCRIPTION OF PREFERRED EMBODIMENTS

Figure 1:
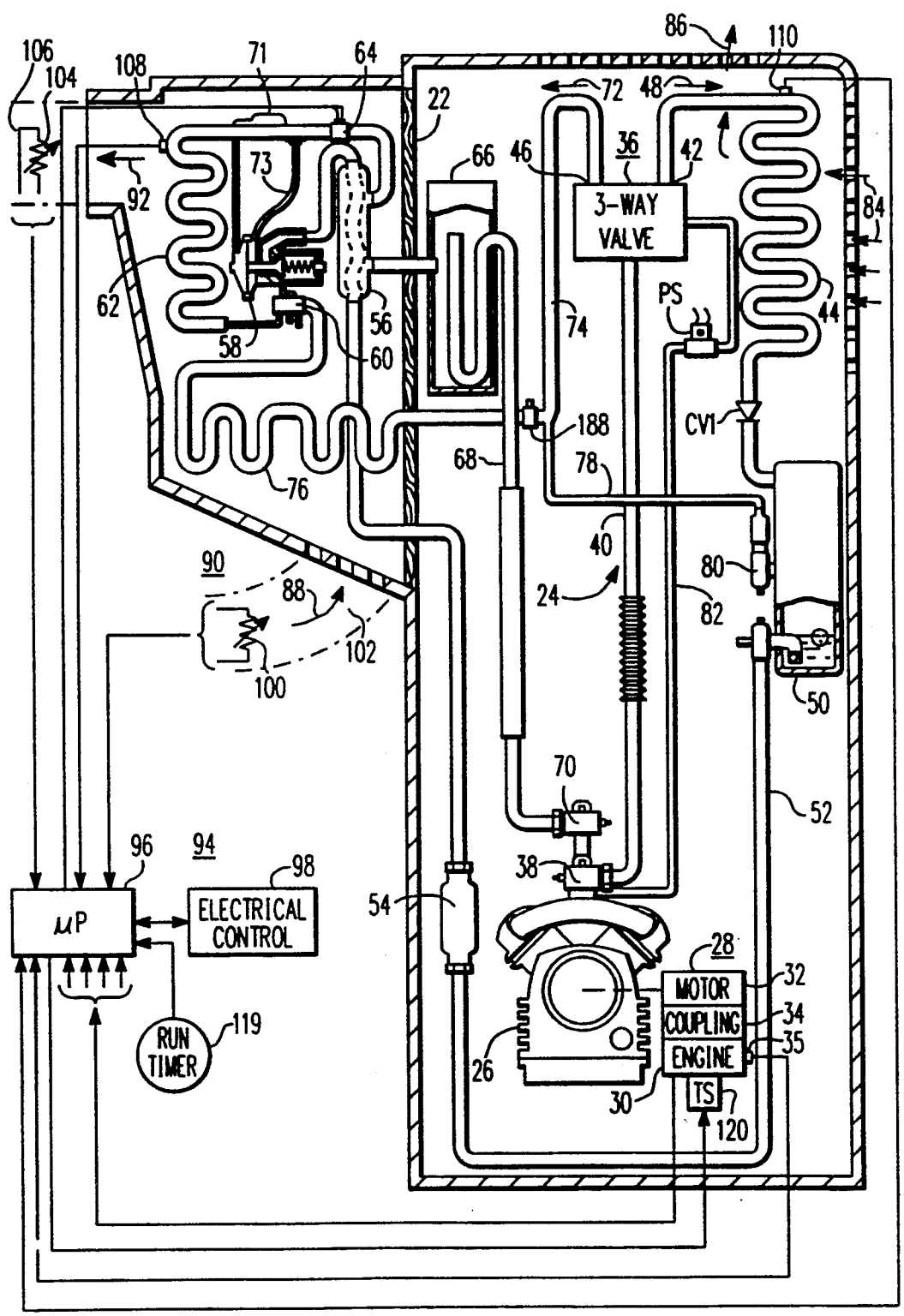
FIG. 1 is a partially block and partially schematic diagram of a refrigeration system which may utilize the methods of the invention.

Referring now to the drawing, and to FIG. 1 in particular, there is shown a transport refrigeration unit 20 which may utilize the methods of the invention. Refrigeration unit 20 may be mounted on a container, truck, or trailer, such as on a wall 22 thereof, for example. Refrigeration unit 20 has a closed fluid refrigerant circuit 24 which includes a refrigerant compressor 26 driven by a prime mover arrangement 28. Prime mover arrangement 28 includes an internal combustion engine 30, and it may optionally include a stand-by electric motor 32. Engine 30 and motor 32 are coupled to compressor 26 by a suitable clutch or coupling 34 which disengages engine 30 while motor 32 is operative. A selector 35 selects one of the two prime movers and provides an output signal to identify the selection.

Discharge ports of compressor 26 are connected to an inlet port of a three-way valve 36 via a discharge service valve 38 and a hot gas line 40. The functions of three-way valve 36, which selects heating and cooling cycles, may be provided by two separate valves, if desired. Three-way valve 36 has a first output port 42, which is selected to initiate a cooling cycle, with the first output port 42 being connected to the inlet side of a condenser coil 44. Three-way valve 36 has a second outlet port 46, which is selected to initiate a heating cycle, as will be hereinafter described.

When three-way valve 36 selects the cooling cycle output port 42, it connects compressor 26 in a first refrigerant circuit 48, which in addition to condenser 44, includes a one-way condenser check valve CV1, a receiver 50, a liquid line 52, a refrigerant drier 54, a heat exchanger 56, an expansion valve 58, a refrigerant distributor 60, an evaporator coil 62, an optional controllable suction line modulation valve 64, another path through heat exchanger 56, an accumulator 66, a suction line 68, and back to a suction port of compressor 26 via a suction line service valve 70. The operative prime mover may be protected against overload by controlling modulation valve 64 to provide the function of a conventional compressor throttling valve, as taught by U.S. Pat. No. 4,977,751, which is assigned to the same assignee as the present application; or, a conventional compressor throttling valve may be disposed in suction line 68, as desired. Expansion valve 58 is controlled by a thermal bulb 71 and an equalizer line 73.

When three-way valve 36 selects the heating cycle output port 46, it connects compressor 26 in a second refrigerant circuit 72. The second refrigerant circuit 72 by-passes condenser 44 and expansion valve 58, connecting the hot gas output of compressor 26 to the refrigerant distributor 60 via a hot gas line 74 and a defrost pan heater 76. A hot gas by-pass solenoid valve 77 may optionally be disposed in hot gas line 74. A by-pass or pressurizing line 78 connects hot gas line 74 to receiver 50 via by-pass and check valves 80, to force refrigerant from receiver 50 into an active refrigerant circuit during heating and defrost cycles.

A conduit or line 82 connects three-way valve 36 to the low side of compressor 26 via a normally closed pilot solenoid valve PS. When solenoid valve PS is de-energized and thus closed, three-way valve 18 is spring biased to select the cooling cycle output port 42. When evaporator 62 requires defrosting, and when the load being conditioned requires heat to maintain set point, pilot solenoid valve PS is energized to allow the low pressure side of compressor 26 to operate three-way valve 36 to select the heating cycle output port 46.

A condenser fan or blower (not shown) causes ambient air 84 to flow through condenser coil 44, with the resulting heated air 86 being discharged to the atmosphere. An evaporator fan or blower (not shown) draws air 88, called "return air", from a served space 90 whose air is to be conditioned, through the evaporator coil 62, and the resulting cooled or heated air 92, called "discharge air", is returned to the space 90. During an evaporator defrost cycle, the evaporator fan or blower is not operated, and a defrost air damper may be operated to close the discharge air path to the conditioned space 90.

Transport refrigeration unit 20 is controlled by microprocessor based electrical control 94 which includes a microprocessor 96 and electrical control 98. Electrical control 98 includes relays, and the like, as will be explained relative to FIGS. 2A and 2B. The microprocessor 96 receives input signals from appropriate sensors, such as from a return air temperature sensor 100 disposed in a suitable return air path 102, a discharge air temperature sensor 104 disposed in a suitable discharge air path 106, from a coil temperature sensor 108 disposed to sense the temperature of the evaporator coil 62, from a refrigerant pressure sensor (HPCO) 110 disposed on the high side of the refrigerant circuit 48, and from various engine sensors shown in FIG. 2B, such as oil level sensor 112, oil pressure sensor 114, engine coolant temperature sensor 116, and engine speed sensor 118. A timer 119 may accumulate operational time of unit 20 and provide a signal RUNT to microprocessor 96 for maintenance purposes. Instead of a hardware timer, microprocessor 96 may also tabulate run time in a software timer.

Microprocessor 96, among other things, controls modulation valve 64, hot gas solenoid valve 77, and a throttle or high speed solenoid 120. Other functions controlled by microprocessor 96 are shown in FIGS. 2A and 2B, and will be hereinafter described.

Figure 2A:
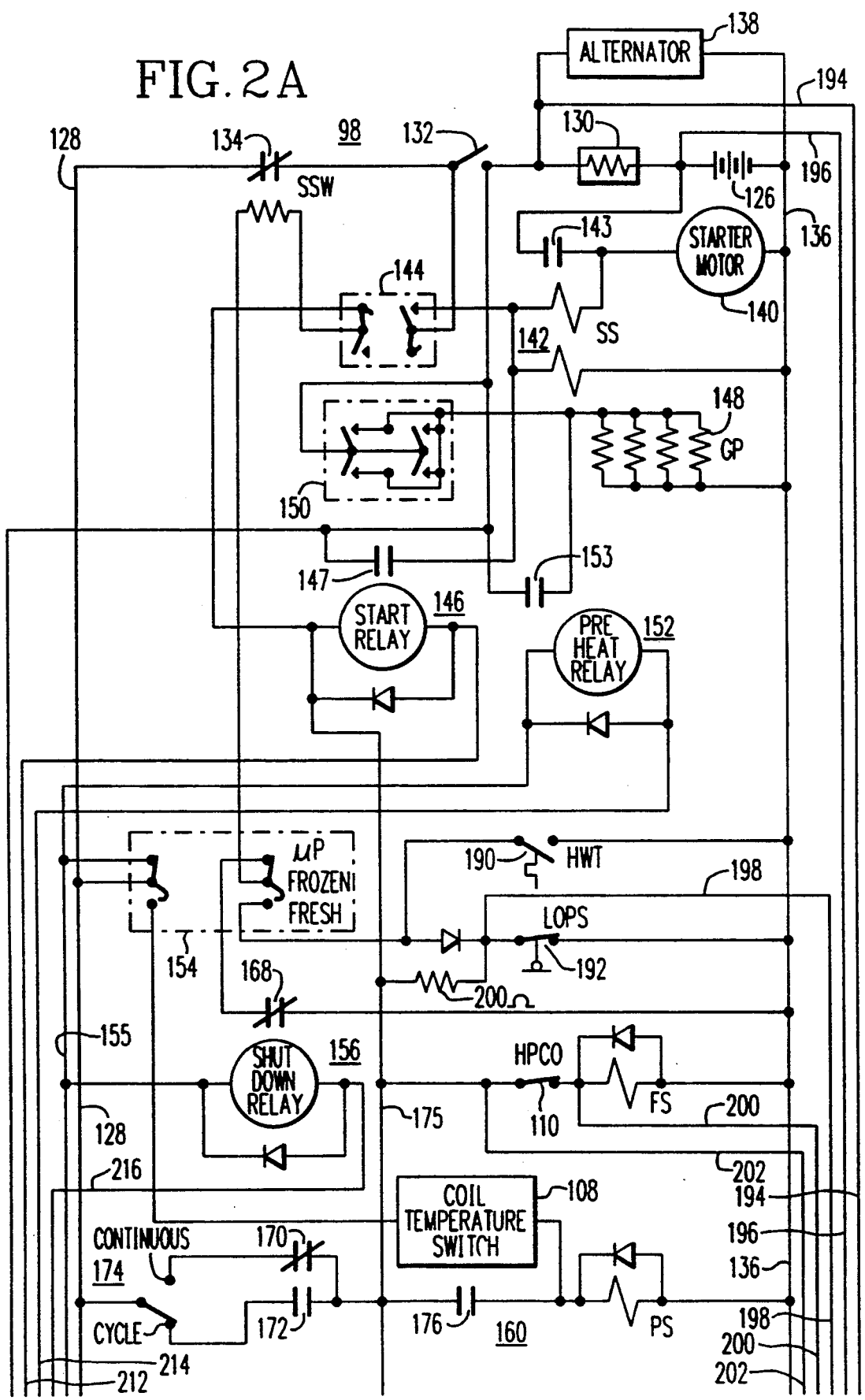
FIGS. 2A and 2B may be assembled to provide an electrical schematic diagram of microprocessor based electrical control shown in block form in FIG. 1.
Figure 2B:
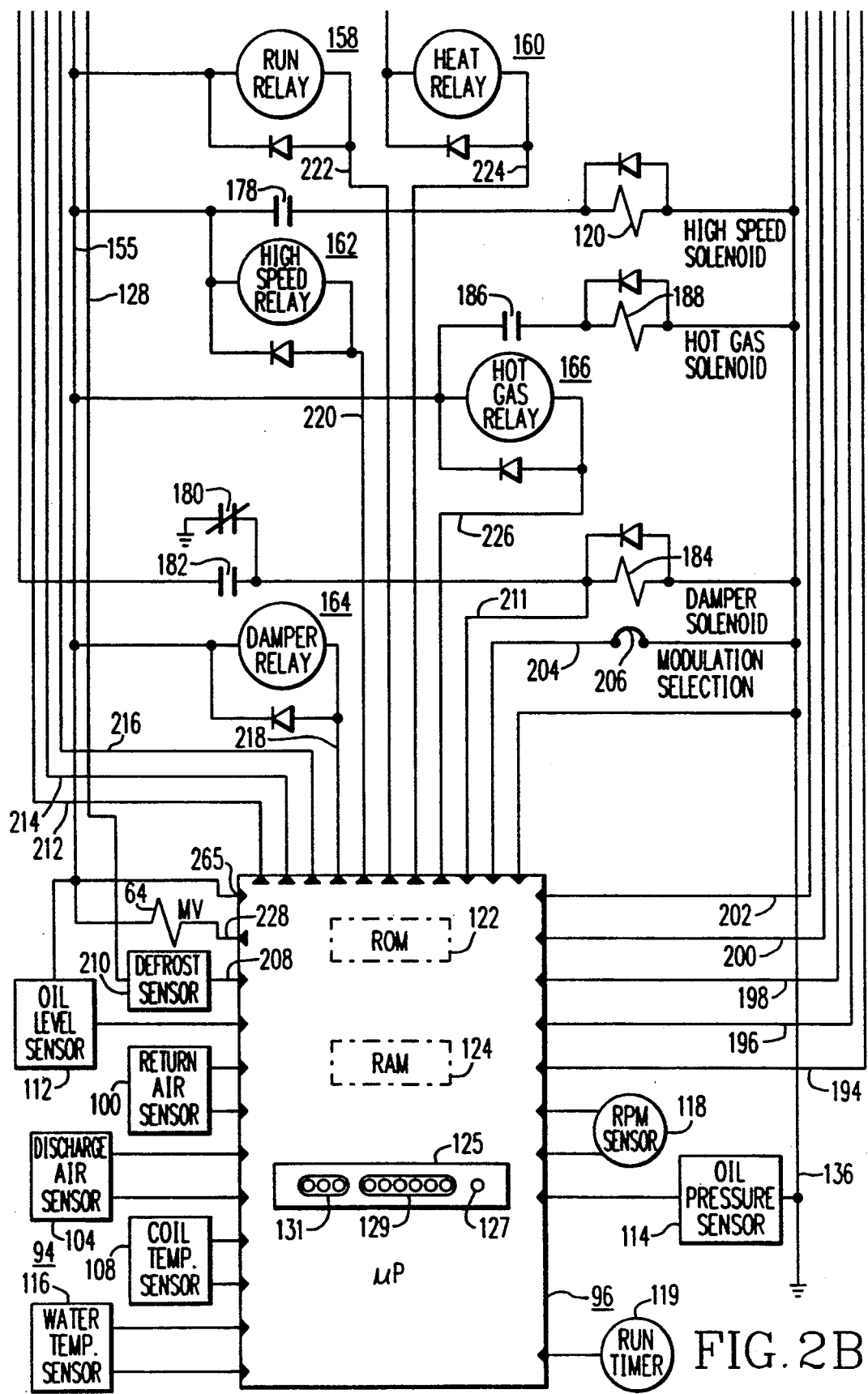

FIGS. 2A and 2B may be assembled to provide a detailed schematic diagram of microprocessor based electrical control 94, which includes microprocessor 96 and control 98. As is well known, microprocessor 96 includes a read-only memory (ROM) 122 for storing programs to be hereinafter described, and a random access memory (RAM) 124 for software timers, flags, input signals, output signals, and other values generated by the operating programs. Microprocessor 96 also includes a display 125 for displaying fault codes, flashing alarms, steady alarms, system status indicating lights, and the like, with reference 127 being an alarm indicator light which can be flashed on and off for a flashing alarm signal, as well as illuminated steadily for a steady alarm signal. Display 125 also has a plurality of buttons 129 for providing input signals to the microprocessor from the operator, including coded signals which enable only personnel having access to the codes to cause microprocessor 96 to perform certain tasks. Display 125 additionally includes a display portion 131 which generates illuminated numbers and/or letters in predetermined coded combinations to identify the cause of certain faults when then occur.

Electrical control 98 includes a battery 126 which has one side connected to a first conductor 128 via a DC shunt 130, an on-off switch 132, and normally closed contacts 134 of a protective reset switch SSW. The remaining side of battery 126 is connected to conductor 136, which is grounded. Control 98 further includes an alternator 138 driven by prime mover 28; a starter motor 140, for cranking engine 30, which is controlled by a starter solenoid 142 having associated normally open contacts 143, an ignition switch 144, and a start relay 146 having associated normally open contacts 147; and glow plug resistors (GP) 148, for pre-heating engine 30, which are controlled by a pre-heat switch 150 and by a pre-heat relay 152 which has normally open contacts 153.

Control 98 also includes a three-position switch 154 which has two banks of three terminals each comprising a center terminal and upper and lower terminals, with reference to FIG. 2A. Switch 154, in the illustrated upper position which connects the center terminal to the upper terminal, places unit 20 under control of the microprocessor 96. The upper position provides voltage from conductor 128 to a conductor 155. An intermediate position of switch 154, in which the center terminal is not connected to either the upper terminal or the lower terminal, is selected when the microprocessor 96 is not utilized and the load in the conditioned space 90 is frozen. This switch position will cause unit 20 to operate continuously in a low speed cool mode. The lower position of switch 154 is selected when the microprocessor 96 is not utilized and the load in the conditioned space is fresh. This position of switch 154 will cause unit 10 to operate continuously, cycling between heating and cooling cycles under the control of the hereinbefore mentioned coil temperature switch 108. Coil temperature switch 108 is preset to close at a predetermined coil temperature, such as 35 degrees F., to energize the pilot solenoid PS and initiate a heating cycle, and to open at a predetermined higher temperature, such as 38 degrees F., to de-energize pilot solenoid PS and initiate a cooling cycle.

In addition to the relays already mentioned, control 98 includes a shutdown relay 156, a run relay 158, a heat relay 160, a high speed relay 162, a defrost damper relay 164, and a hot gas relay 166. Shutdown relay 156 is normally energized, and is de-energized to shut unit 10 down via its associated set of normally-closed contacts 168 which ground the protective switch SSW and cause it to open its contacts 134. The run relay 158 has normally-closed and normally open contacts 170 and 172, respectively, connected to a mode selector switch 174 which has an input connected to conductor 128. Selector switch 174 selects either a continuous operating mode in which the prime mover 28 operates continuously, or a cycling start-stop mode, also called "cycle sentry", which includes starting and stopping the prime mover 28.

The normally-closed contacts 170 of run relay 158 are connected to the "continuous" position of selector switch 174, and the normally-open contacts 172 of run relay 158 are connected to the "cycling" position of selector switch 174. Contacts 170 or contacts 172 provide voltage to a conductor 175 from conductor 128 and selector switch 174.

Heat relay 160 has a set of normally open contacts 176 for controlling the pilot solenoid PS. High speed relay 162 has a set of normally open contacts 178 for controlling the high speed solenoid 120. Damper relay has a set of normally closed contacts 180 and a set of normally open contacts 182, connected to control a defrost damper solenoid 184. Hot gas relay 166 is provided for controlling the hot gas solenoid valve 77 via a set of normally open contacts 186, when a hot gas solenoid 77 is provided in hot gas line 74.

Control 98 also includes a engine coolant temperature switch (high water temperature -HWT) 190, which closes when the engine coolant reaches a predetermined elevated temperature, and a low oil pressure switch (LOPS) 192 which is open as long as engine pressure is normal. The closing of either switch 190 or 192 will shut unit 20 down via the manual reset switch SSW.

Microprocessor 96 senses the voltage across DC shunt 130 via conductors 194 and 196, and can thus determine the magnitude and polarity of battery current. One polarity, which will be called positive, indicates the battery 126 is being charged by alternator 138, which also indicates the prime mover 28 is running. The other polarity, i.e., negative, indicates the battery is discharging.

Microprocessor 96 also has a conductor 198 which senses the position of the low oil pressure switch 192, conductors 200 and 202 which sense the voltage level on first and second sides, respectively, of the high refrigerant cut-out switch 110, a conductor 204 which senses whether or not a modulation valve selector jumper 206 has connected conductor 204 to system ground 136, a conductor 208 which senses whether or not a defrost sensor switch 210 has operated, signifying the need for a defrost cycle, and a conductor 211 which detects voltage on the damper solenoid 184.

Microprocessor 96 has a plurality of output conductors for controlling various functions, including conductors 212, 214, 216, 218, 220, 222, 224 and 226 for respectively controlling the operation of start relay 146, pre-heat relay 152, shutdown relay 156, damper relay 164, high speed relay 162, run relay 158, heat relay 160, and hot gas relay 166. A conductor 228 is also provided for controlling the current level in the modulation valve 64.

As the microprocessor functions are described, only those necessary to understanding the invention will be described in detail. Certain of the functions shown in block form, may be described in detail and claimed in concurrently filed application Ser. Nos. 728,665, 728,463 and 728,471 which are hereby incorporated into the specification of the present application by reference.

FIG. 3 is a RAM map 230 of RAM 124 illustrating how predetermined events which occur in unit 20 are classified according to the teachings of the invention. Events related to faults which occur in unit 20 are classified into at least first, second and third categories of unit fault conditions respectively referred to as (1) ALSH faults, (2) ALCH faults, and (3) ALLOG faults.

The first class of fault conditions, i.e., ALSH faults, includes the type of fault condition which would cause damage to the unit and/or load being conditioned upon further operation of unit 20, and thus unit 20 is immediately shut down upon the occurrence of an ALSH fault. In addition to shutting unit 20 down upon the occurrence of an ALSH fault condition, the alarm indicator 127 in microprocessor display 125 is flashed at a steady rate, such as one flash per second, and a code which identifies the nature of the fault condition is immediately displayed in portion 131 of the display.

The second class of fault conditions, i.e., ALCH faults, includes the type of fault condition which will not damage the unit and/or load with continued operation of unit 20, but it is a type of fault condition which should be immediately called to the attention of the operator. Upon the occurrence of an ALCH fault condition, the alarm indicator 127 in display 125 is continuously energized, and a code which identifies the nature of the ALCH fault condition is immediately displayed in portion 131 of display 125.

The third class of fault conditions, i.e., ALLOG faults, includes those fault conditions which will not damage the unit and/or load with continued operation of unit 20, and which are not severe enough to require immediate notification to the operator. When an ALLOG fault occurs the fact that it has occurred is logged or stored in RAM 124. Stored ALLOG faults are periodically displayed such as by sequencing them through display portion 131 each time unit 20 is started. ALLOG fault codes may also be displayed upon entry of a proper command via the entry buttons 129, and/or they may be downloaded upon command to a suitable hand-held maintenance tool at a time of routine maintenance.

Events related to maintenance of unit 20, such as unit running time RUNT, are stored in RAM 124 as a fourth category ALGA, as shown in the RAM map of FIG. 3. ALGA events are logged and periodically displayed in the same manner as ALLOG alarms with the difference between the two categories, other than the nature of the events stored therein, being in the way the logged events may be cleared. ALLOG alarms may be cleared by the operator via the input buttons 129 after they are noted and corrected. ALGA alarms, related to maintenance of unit 20, may only be cleared through a "guarded access" procedure requiring access to, or knowledge of, predetermined codes. Thus, only authorized service personnel in charge of providing periodic maintenance to unit 20 may clear ALGA alarms.

In order to describe the methods of the invention, certain flow diagrams shown and described in detail in the hereinbefore mentioned concurrently filed applications will be described. The flow diagrams will be described primarily from the view point of the alarms they generate, as the concurrently filed applications may be referred to for details which are outside the scope of the present invention.

Figure 4:
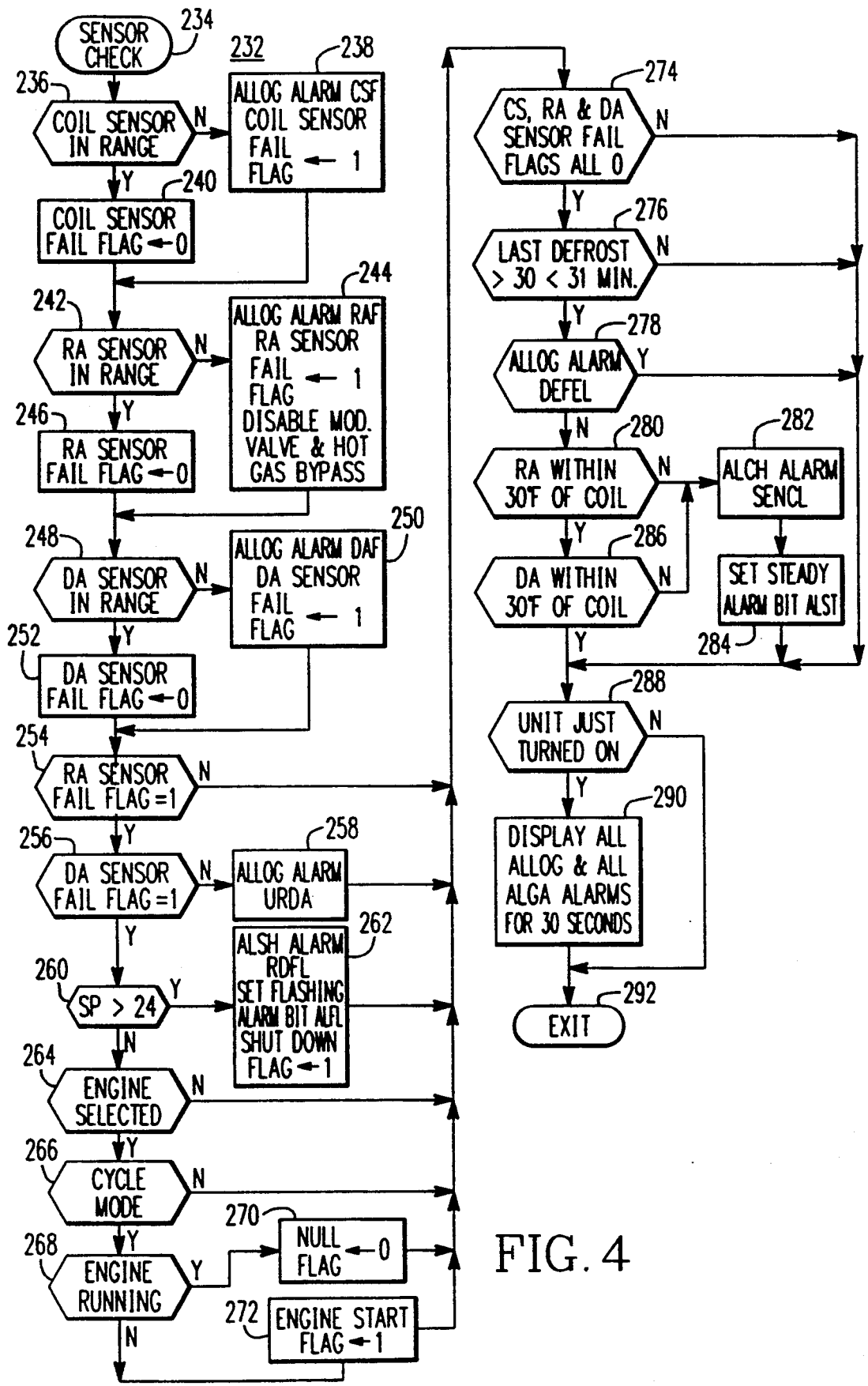
FIG. 4 is a flow diagram of a program "sensor check" which implements certain teachings of the invention.

FIG. 4 is a flow diagram of a program 232 "sensor check", which is similar to FIG. 12 of incorporated application Ser. No. 728,463, except modified to set forth the teachings of the invention.

Program 232 is entered at 234 and step 236 checks the value provided by evaporator coil sensor 108 shown in FIG. 1 to see if the value is in a plausible range. If not, step 238 stores an ALLOG alarm CSF (evaporator coil sensor failed) in RAM 124, as indicated in the RAM map of FIG. 3. Step 238 also sets a coil sensor fail flag true which is located in RAM 124. If step 236 finds the value of sensor 108 in the proper range, step 240 sets coil sensor fail flag false.

Step 242 checks the value of the return air sensor 100. If the value is outside the proper range, step 244 stores an ALLOG alarm RAF (return air sensor failed) in RAM 124, it sets a return air sensor fail flag true, and it disables the use of the modulation valve 64 and hot gas by-pass solenoid 188, as they are used only with return air control. If step 242 finds the return air sensor 100 functional, step 246 sets the return air sensor fail flag false.

Step 248 checks the value of the discharge air sensor 104. If outside the proper range, step 250 sets an ALLOG alarm DAF (discharge air sensor failed) in RAM 124, and it sets a discharge air sensor fail flag true. If discharge air sensor 104 is functional, step 252 sets the discharge air sensor fail flag false.

Return air control is the preferred operational mode for unit 20, and step 254 checks the return air sensor fail flag. If it is not true, unit 20 can operate in the preferred mode, and the program advances to step 274, omitting a portion of program 232 devoted to finding a way to operate unit 20 without the return air sensor 100. If the return air sensor fail flag is true, step 254 goes to step 256 which checks the discharge air sensor fail flag, as discharge air control is the preferred back-up when the return air sensor is not functional. If the discharge air sensor 104 is functional, step 258 sets an ALLOG alarm URDA (unit running on discharge air control) in RAM 124, and the program advances to step 274.

If the discharge air sensor fail flag is true, unit 20 is without a functional return air sensor and without a functional discharge air sensor. Instead of immediately shutting unit 20 down, step 260 determines if the selected set point temperature (SP) is above 24 degrees F. If SP is above 24 degrees F. it indicates the load in space 90 is a fresh or perishable load and unit 20 cannot be operated without danger of causing damage to the load.

Figure 5:
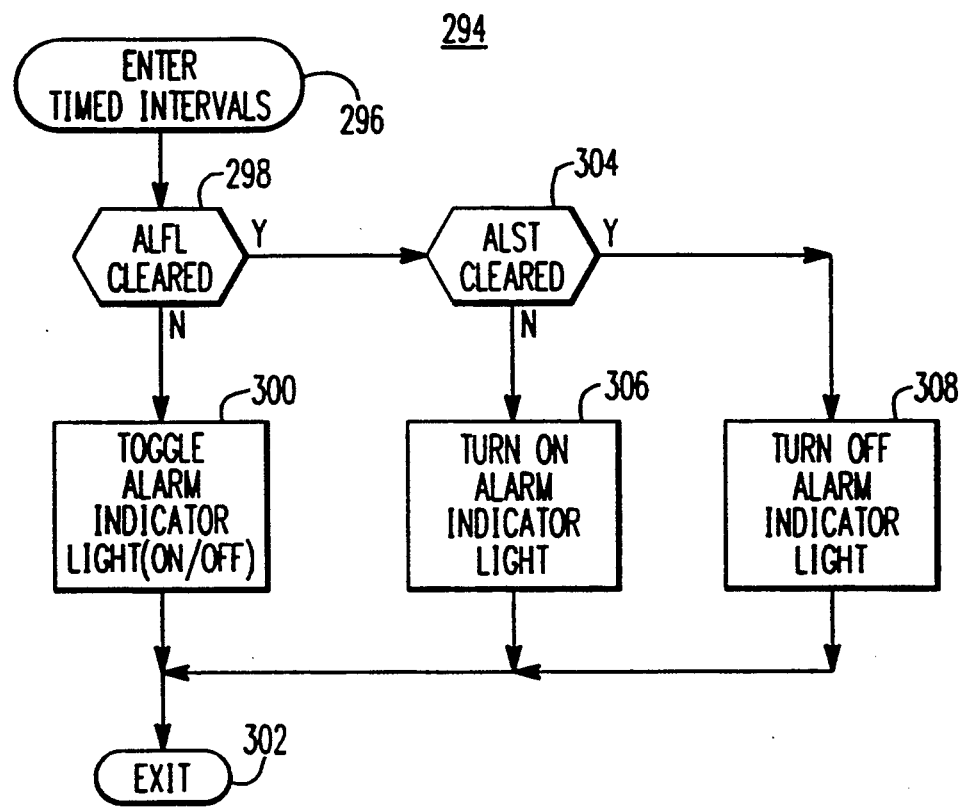
FIG. 5 is a flow diagram of a program which controls an alarm indicator light.

Thus, step 262 sets an ALSH alarm RDFL (return and discharge air sensors failed), with this alarm identifying RDFL with a code, such as two digit code, at location 131 on display 125. Step 262 also sets a flashing alarm bit ALFL in RAM 124 which causes indicator light 127 on display 125 to flash at a predetermined rate. FIG. 5, to be hereinafter described, sets forth a program which controls the operation of the alarm indicator light 127. Step 262 also sets a shutdown flag true, which will subsequently cause unit 20 to be shutdown. Step 262 then advances to step 274.

If step 260 finds set point to be 24 degrees F. or below, the load in space 90 is a frozen load and may be preserved by operating unit 20 continuously in a low speed cooling cycle. Step 264 determines which of the two prime movers, engine 30 or electric motor 32, has been selected as the prime mover. If electric motor 32 is the prime mover, step 262 goes to step 274. If engine 30 is the prime mover, step 266 checks to see if switch 174 is set for the continuous mode or the cycling mode. If the continuous mode is selected, step 266 goes to step 274. If the cycling mode has been selected, step 268 checks to see if engine 30 is running. If engine 30 is not running, step 272 sets an engine start flag true, which will start engine 30. If engine 30 is running, step 270 sets a null flag false, which will prevent engine 30 from stopping, i.e., going into a null mode. Steps 270 and 272 both go to step 274.

Step 274 determines if the fail flags for the coil sensor 108, return air sensor 100 and discharge air sensor 104 are all false. If they are all false, then program 232 enters a portion which checks the calibration of the three sensors. If one or more of the three fail flags are false, then program 232 advances to step 288. If step 272 finds the three sensors functional, step 276 checks to make sure it has been about 30 minutes since the last defrost operation, so that the temperature of evaporator coil 62 will be in a known stable temperature range. If step 276 is satisfied, step 278 checks to see if there is an ALLOG alarm DEFEL provided in response to a defrost timer elapsing, which indicates that evaporator 62 should be defrosted. If there is no ALLOG alarm DEFEL, step 280 then checks to see if the return air sensor 100 is within 30 degrees of the evaporator coil sensor 108. If not, step 282 sets an ALCH alarm SENCL (sensors out of calibration), which immediately causes a code which identifies SENCL to appear at display location 131. Step 282 sets a steady alarm bit ALST in RAM 124, which causes alarm indicator light 127 to be energized continuously. Thus, unit 20 is not shut down, but the nature of the alarm condition is one which should be called to the attention of the operator immediately. If the comparison of the return air sensor and coil sensor in step 280 is successfully passed, step 286 makes a similar comparison between the values of the discharge air sensor 104 and the evaporator coil sensor 108. If this comparison test is not passed, step 286 goes to steps 282 and 284 to initiate the ALCH alarm SENCL.

The "no" branches from steps 274 and 276, the "yes" branches from steps 278 and 286, and step 284 all advance to step 288 to determine if unit 20 has just been turned on, e.g., by checking to see if a condition flag CF has been initialized. If step 288 finds unit 20 has just been turned on, step 290 displays all ALLOG and all ALGA alarms on display 125 for a predetermined period of time, such as 30 seconds. This alerts the operator to all alarms which have been logged and not cleared at the time unit 20 is started, and he has the option of getting maintenance to check, repair, maintain, etc., the indicated item or items. The program exits at 292.

FIG. 5 is a flow diagram of a program 294 which is entered at regular time intervals, such as once a second, to attend to the operation of alarm indicator light 127 on display 125. Program 294 is entered at 296 and step 298 checks to see if the ALFL bit in RAM 124 has been cleared. If it is set, it indicates the presence of an ALSH alarm, and step 300 toggles the alarm indicator light on and off. Since this program runs every second, alarm light 127 will flash every second for as long as there is one ALSH alarm which has not been cleared. The program then exits at 302.

If step 298 finds the ALFL bit cleared, step 304 checks the ALST bit. If the ALST bit in RAM 124 is set, it indicates the presence of at least one ALCH alarm, and step 306 turns alarm indicator light 127 on, as alarm indicator light 127 is continuously energized when there are no ALSH alarms and there is at least one ALCH alarm. Should an ALSH alarm now occur, steps 298 and 300 will take control and alarm indicator light 127 on the next running of program 294, and indicator light 127 will then start flashing. Step 306 goes to exit 302 If step 304 finds the ALST bit cleared, step 308 turns alarm indicator light 127 off, to clear any existing indications of an uncleared alarm.

FIGS. 6 through 10 are similar to FIGS. 4 through 8 of incorporated application Ser. No. (identified with applicant's docket number 56753), except modified to set forth the teachings of the invention. These programs illustrate teachings of the invention which grade the severity of certain alarm conditions, placing alarms of like nature in different alarm categories. In order to simplify comparing current draws from battery 126, current draw from the battery will be considered to be positive. Also, all current draw measurements will include the current draw of shutdown relay 156, unless specifically stated that shutdown relay 156 is de-energized, in order to keep safety switch 134 out of the current draw circuit.

Figure 6:
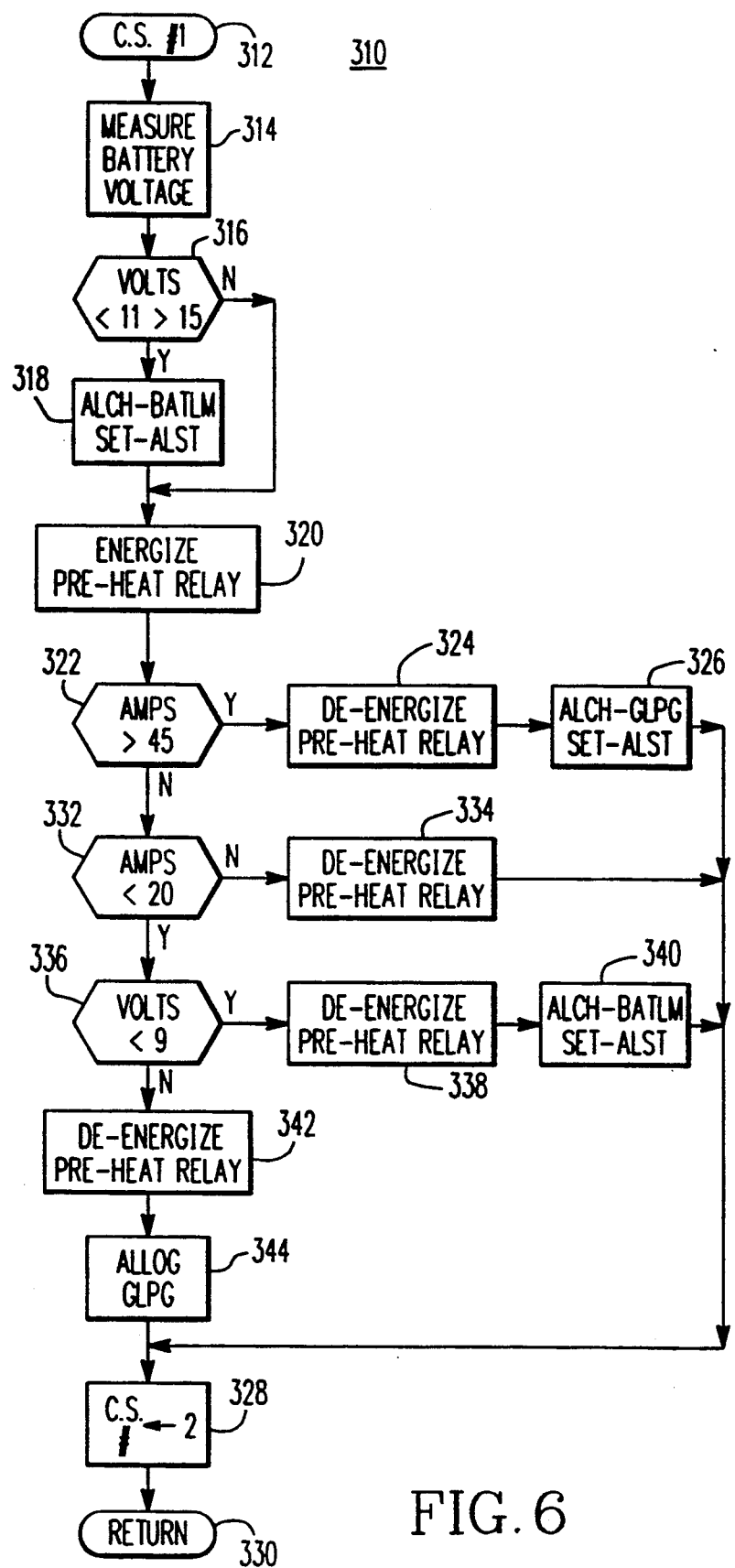
FIG. 6 is a flow diagram of a program which checks the battery voltage and current draw of an engine preheat circuit.

FIG. 6 is a flow diagram of a program 310, also called case select number 1, which is run periodically by a case select program shown in detail in the above identified application. Program 310 is entered at 312 and step 314 measures the voltage of battery 126 using inputs from conductors 196 and 136. Step 316 checks the measured battery voltage against upper and lower limits stored in ROM 122, such as 15 and 11 volts, respectively, for a battery having a nominal rating of 12 volts. If the battery is not within these limits, step 318 sets an ALCH alarm BATLM (battery out of limits), which displays a code for BATLM at display portion 131, and the alarm indicator light bit ALST is set to cause alarm indicator light 127 to be continuously energized. Step 318 goes to step 320, as does the "no" branch from step 316.

Step 320 energizes pre-heat relay 152 which closes its normally open contacts 153 to energize glow plug resistors (GP) 148. Step 322 checks to see if the resulting current, as measured by conductors 194 and 196 across DC shunt 130, exceeds a predetermined upper limit, e.g., 45 amperes, stored in ROM 122. If the current exceeds the upper limit, step 324 de-energizes pre-heat relay, and step 326 sets an ALCH alarm GLPG (glow plug circuit exceeds upper current draw limit), which displays the GLPG code at 131, and it sets the alarm indicator light bit ALST, which results in energizing indicator light 127 continuously. Step 326 goes to step 328 which changes the case select number to #2, and the program exits at 330.

If the test applied by step 322 is passed, step 332 checks the measured current against a lower limit stored in ROM 122, e.g., 20 amperes. If the measured current is not below 20 amperes, the circuit comprising the pre-heat relay and glow plug resistors has passed the check on current draw and the program goes to step 328.

If the measured amperes are less than the lower limit, step 336 goes to ROM 122 for a lower battery limit than used in step 316, e.g., 9 volts instead of 11 volts, and checks the battery voltage measured in step 314 against this new lower limit. If the battery voltage is less than this new lower limit, the program decides the cause of the low current measurement is due to the battery condition, step 338 de-energizes pre-heat relay 152, and step 340 repeats step 318, providing an ALCH alarm BATLM.

If step 336 finds that the battery voltage is not lower than the new lower limit, the program decides that there is a problem in the circuit which includes the pre-heat relay and glow plug resistors, and the program goes to step 342 which de-energizes pre-heat relay 152, and to step 344 which sets an ALLOG alarm GLPG. While the same alarm mnemonic GLPG is used in steps 326 and 344, the alarms indicate different abnormal conditions in the glow plug circuit. The ALCH alarm GLPG accompanied by the continuously energized indicator light 127 indicates the current draw of the glow plug circuit exceeds a predetermined upper current draw limit. The ALLOG alarm GLPG, which does not energize alarm indicator light 127, indicates the current draw of the glow plug circuit is below a predetermined acceptable lower current draw limit. The program then goes to step 328 and exit 330.

Figure 7:
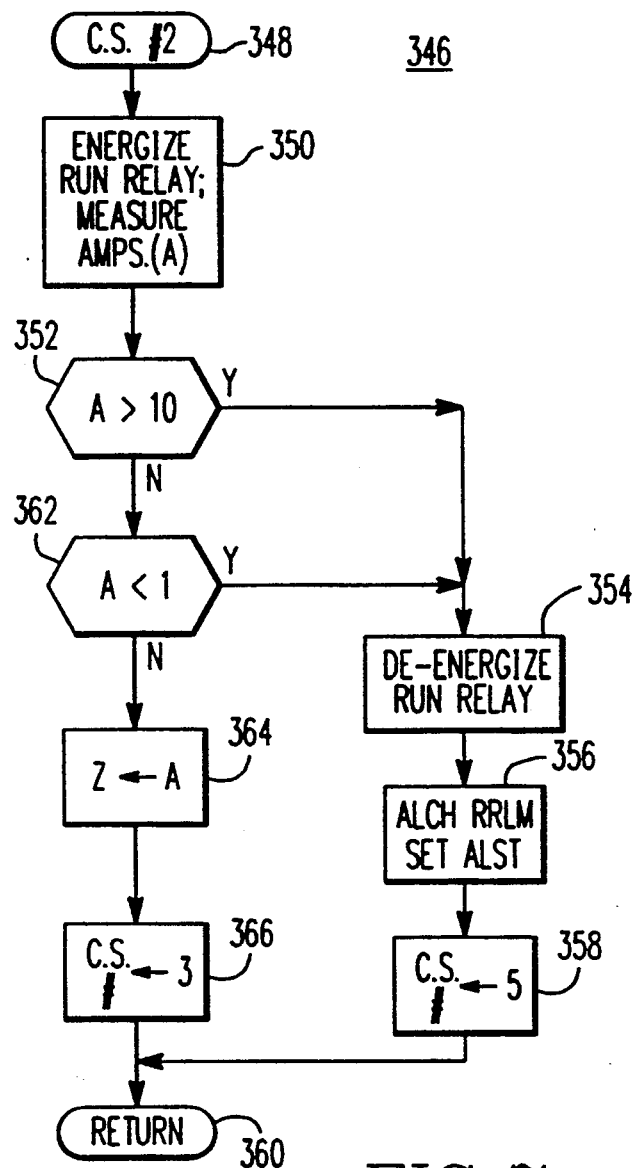
FIG. 7 is a flow diagram which checks current draw of a run relay circuit.

FIG. 7 is a flow diagram of a program 346 for case select number 2, the number requested in step 328 of FIG. 6. Program 346 is entered at 348 and step 350 energizes run relay 158, which closes its contacts 172 to energize conductor 175. The case select program which runs the different program segments identified by the case select numbers checks to make sure switch 174 is in the position indicated in FIG. 2A, before allowing the current checking case select programs to run. Step 350 also measures the current draw, which will be called value A. Letters at the beginning of the alphabet will be used to identify different current measurements in any one program segment, while letters at the end of the alphabet will be used to identify stored values of current measurements. Only the stored value Z will carry over from one program segment to another.

Step 352 compares value A with a predetermined upper limit, e.g., 10 amperes, stored in ROM 122. If value A exceeds the upper limit, step 354 de-energizes run relay 158, step 356 sets an ALCH alarm RRLM (run relay circuit current out of limits), and the steady alarm bit ALST is set. Step 358 sets the case select number to 5, skipping program segments identified with case select numbers 3 and 4 as those program segments require a normal current draw for run relay 158. The program exits at 360.

If step 352 finds the upper current draw limit is not exceeded by the run relay circuit, step 362 checks value A against a predetermined lower current draw limit, e.g., 1 ampere. If the current draw of the run relay circuit is less than the lower limit, steps 354, 356 and 358 set the ALCH alarm RRLM. If value A exceeds the lower limit, step 364 stores value A as stored value Z, for use in later run program segments, step 366 sets the case select number to 3, and the program exits at 360.

Figure 8:
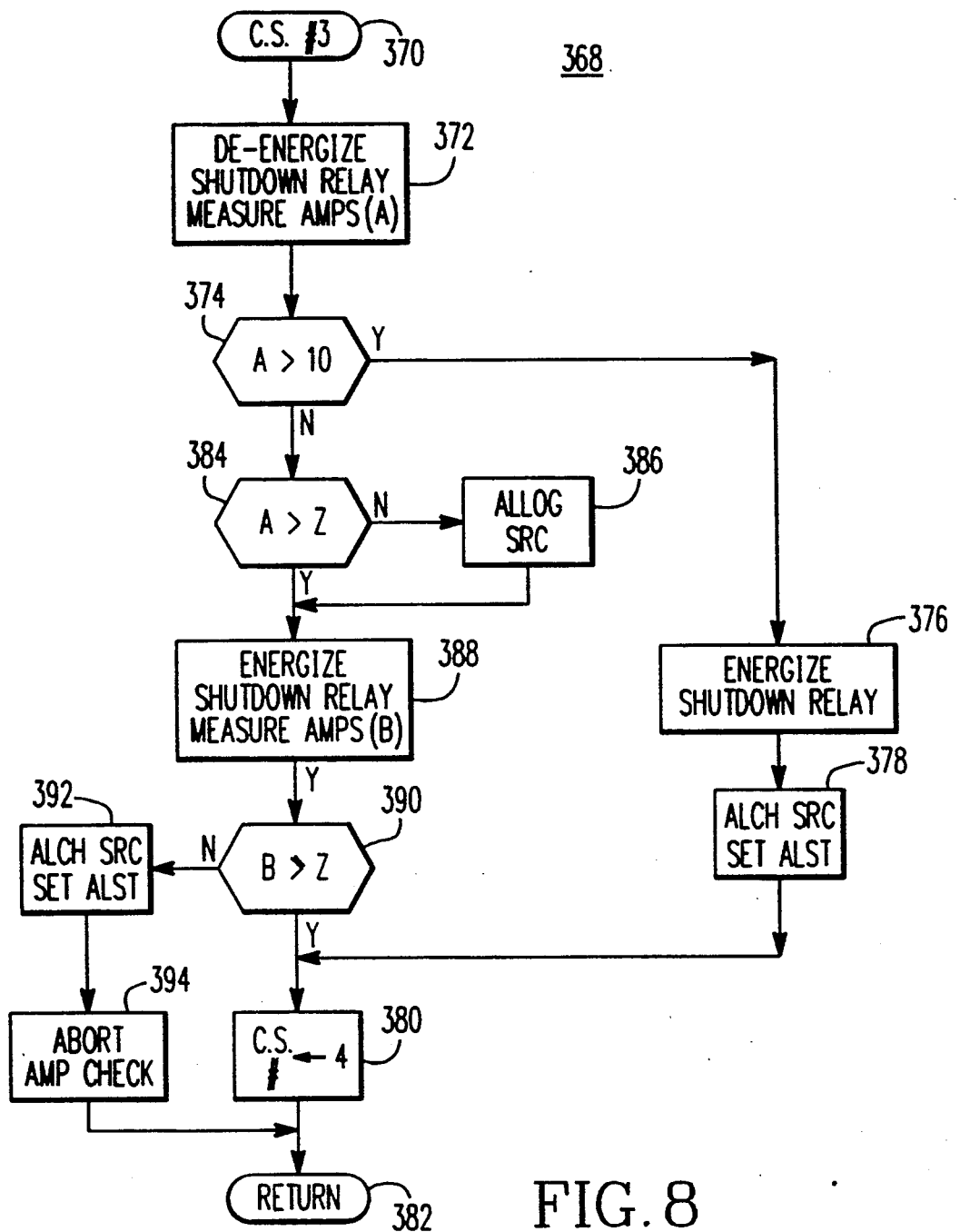
FIG. 8 is a flow diagram which checks current draw of a shutdown circuit.

FIG. 8 is a flow diagram of a program 368 for a program segment which runs case select #3. Shutdown relay 156 is normally energized, so that it will fail safe when it is de-energized for some reason. When shutdown relay 156 is de-energized its normally closed contacts 168 connect a resistor portion of safety switch SSW into the circuit, and after a period of time, switch SSW will open its contacts 134, removing power from conductor 128 and shutting unit 20 down. Switch SSW must be then be manually reset. Program segment 370 runs much faster than the time delay of safety switch SSW, allowing the current draw of the safety switch circuit to be measured.

More specifically, program 368 is entered at 370 and step 372 de-energizes shutdown relay 156 and the current draw is measured as value A. Step 374 checks value A against a predetermined upper limit, e.g., 10 amperes, and if the upper limit is exceeded, step 376 energizes shutdown relay 156 and step 378 sets an ALCH alarm SRC (shutdown current circuit exceeds upper limit) by displaying the proper alarm code for alarm SRC, and by setting the ALST alarm indicator light bit, to energize alarm indicator light 127. The program then goes to step 380 which changes the case select number to 4, and the program returns to the program which calls the next case select program segment at 382.

If step 374 finds value A does not exceed the upper current draw limit, step 384 compares value A with the stored value Z, which it will be remembered from FIG. 7 is the current draw of the run relay circuit. Since case select #3 is running, it indicates that run relay 158 was not de-energized by program 346, so the value A should be the total current draw of the run relay circuit (Z) plus the current draw of the safety switch circuit. Thus, value A should exceed value Z. If value A does not exceed stored value Z, there is a problem in the shutdown circuit and step 386 sets an ALLOG alarm SRC. This is a different alarm than ALCH alarm SRC set in step 378, with ALLOG alarm SRC indicating a below normal current draw in the shutdown circuit.

Step 386 and the "yes" branch of step 384 both proceed to step 388 which energizes shutdown relay 156 to take safety switch SSW out of the circuit, and the current draw is measured as value B. Value B should be equal to stored value Z, as program 346 was run with shutdown relay 156 energized to take the safety switch out of the current draw measurement. If value B equals or exceeds stored value Z, the program goes to step 380. If value B is less than stored value Z it indicates a faulty condition in the shutdown circuit and step 392 sets an ALCH alarm SRC as well as setting the alarm indicator light bit ALST, similar to step 378, and with a problem in the shutdown circuit, step 394 aborts the "amp check" function performed by the case select program segments. The operator will know what caused the program to abort because of the set ALCH alarm SRC and steady energization of indicator light 127.

Figure 9:
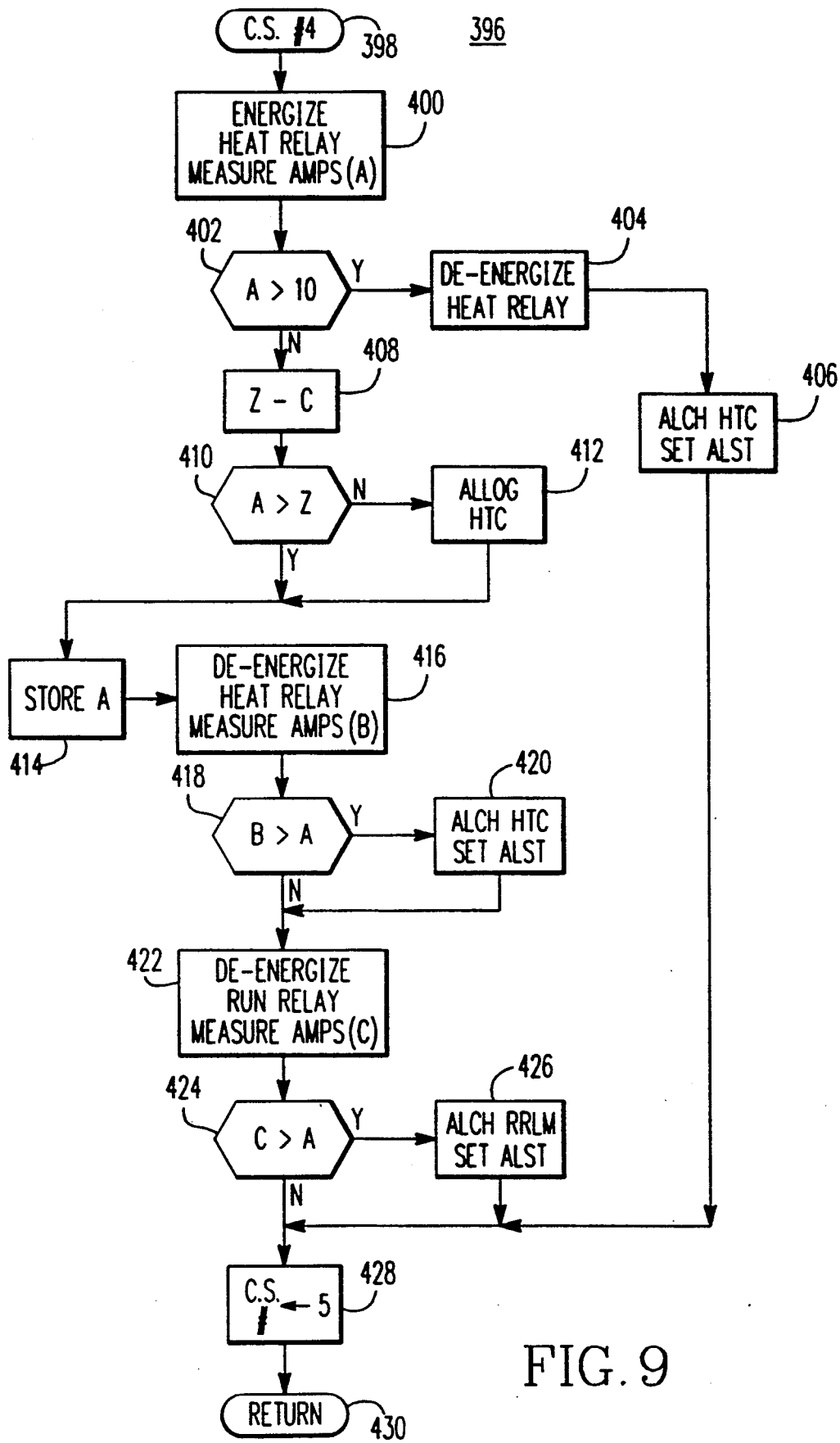
FIG. 9 is a flow diagram which checks current draw of a heat circuit and the run relay circuit.

FIG. 9 is a program 396 for case select program segment #4. If case select #4 runs, it means that run relay 158 will still be energized. Program 396 is entered at 398 and step 400 energizes heat relay 160 which closes its normally open contacts 176 to energize pilot solenoid PS. The current draw of the heat relay circuit which includes pilot solenoid PS is measured as value A.

Step 402 checks value A versus a predetermined upper current draw limit, e.g., 10 amperes. If the upper current draw limit is exceeded, step 404 de-energizes heat relay 160, and step 406 sets an ALCH alarm HTC (current draw out of limits in the heat relay circuit), which step also includes the setting of the ALST alarm indicator bit. Step 406 proceeds to step 428.

If step 402 finds that value A does not exceed the upper current draw limit, and step 410 compares value A with value Z, which was stored for later use in step 364 of FIG. 7. Value A should exceed value Z, as value A should be the current draw of the run relay circuit plus the current draw of the heat relay circuit, while stored value Z is the value of the current draw of the run relay circuit. If value A does not exceed value Z, step 412 sets an ALLOG alarm HTC, with ALLOG alarm HTC indicating a low current draw problem in the heat relay circuit.

Steps 410 and 412 both proceed to step 414 which stores value A for use later in this program, and step 416 de-energizes heat relay 160 and measures the current draw from battery 126 as value B. Value B should be less than stored value A, as the current draw of the heat relay circuit, included in stored value A, should have been eliminated from value B. If step 418 should find that value B exceeds stored value A it indicates a problem in the heat relay circuit, and step 420 sets an ALCH alarm HTC as hereinbefore described relative to step 406.

Steps 418 and 420 both proceed to step 422 which de-energizes run relay 158 and measures the current draw as value C. Step 424 compares value C with stored value A. Stored value A represents the combined current draw of the run relay circuit and the heat relay circuit, while value C is the current draw with the run relay and heat relay both de-energized. Thus, value C should not exceed value A. If value C exceeds value A, there is a problem in the run relay circuit, and step 426 sets ALCH alarm RRLM and alarm indicator bit ALST, as hereinbefore described relative to step 356 in FIG. 7. Steps 406 and 426, and the "no" branch from step 424 proceed to step 428 which sets the case select number to #5, and the program exits at 430. Since program 396 de-energizes run relay 158, the next program segments will be run with run relay 158 de-energized and stored value Z will no longer be used.

Figure 10:
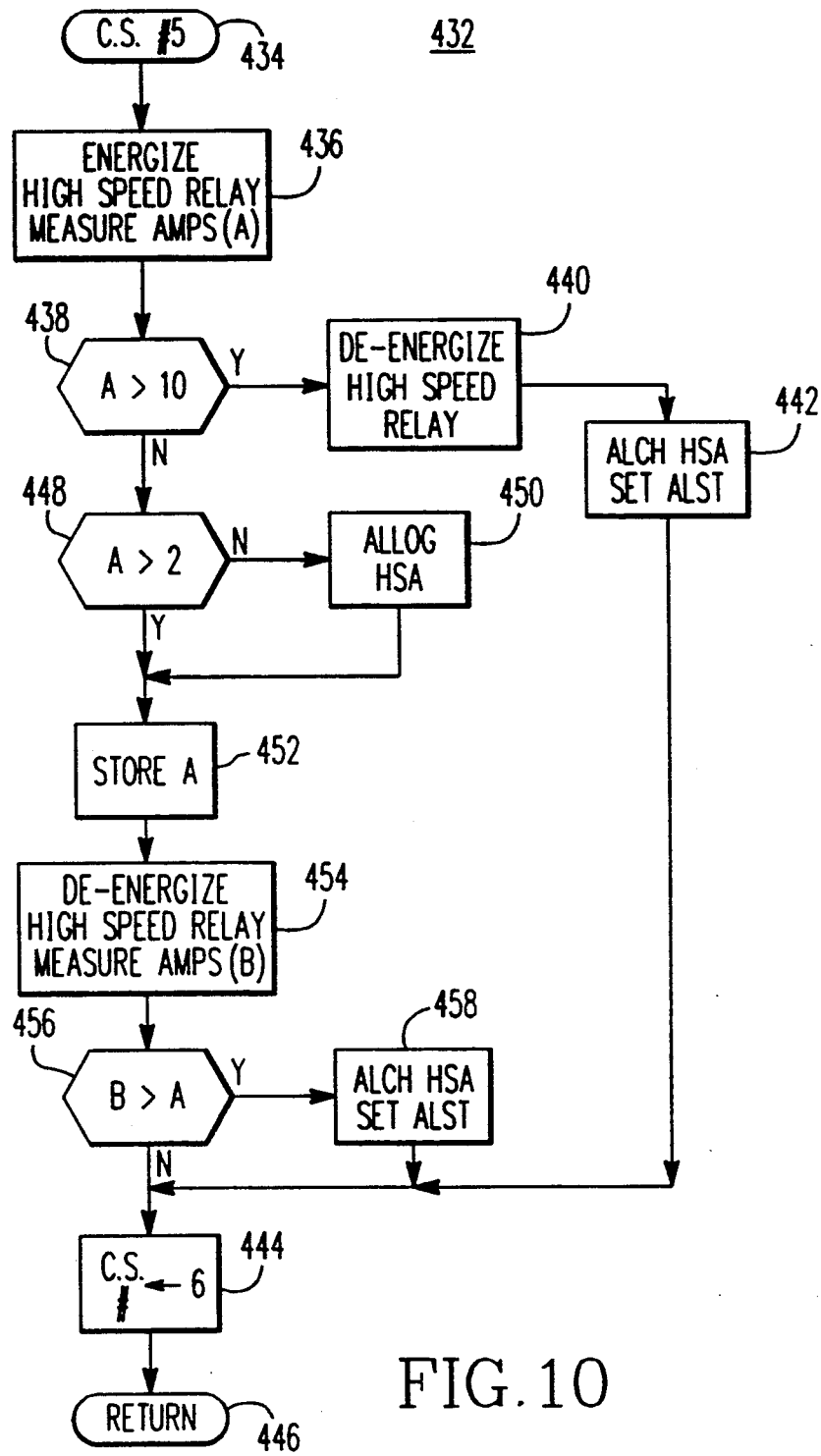
FIG. 10 is a flow diagram which checks current draw of a high speed circuit.

A program 432 for running case select program segment #5 is shown in FIG. 10. Program 432 is entered at 434 and step 436 energizes high speed relay 162 which closes its normally open contacts 178 to energize high speed solenoid 120. Step 436 also measures the current draw from battery 126 as value A.

Step 438 compares value A with a predetermined upper limit, e.g., 10 amperes, and if value A exceeds the upper current draw limit, step 440 de-energizes high speed relay 162 and step 442 sets ALCH alarm HSA (high speed circuit current draw is excessive). Step 442 also sets the steady alarm bit ALST, and the program goes to step 444 which changes the case select number to #6. The program then returns to the main case select program at 446.

If value A does not exceed the upper current draw limit, step 448 compares value A with a predetermined lower current draw limit, e.g., 2 amperes. If value A is below the lower limit, step 450 sets an ALLOG alarm HSA, with ALLOG alarm HSA indicating that the current draw of the high speed circuit is less than the lower limit.

Step 450 and the "yes" branch of step 448 proceed to step 452 which stores value A for use later in this program. Step 454 then de-energizes high speed relay 162 and measures the current draw as value B. Step 456 then compares value B with stored value A. Since value B represents the current draw with the high speed relay circuit de-energized it should be less than stored value A which is the current draw with the high speed circuit energized. If value B exceeds stored value A, then there is a problem of excessive current draw in the high speed circuit and step 458 sets ALCH alarm HSA and it sets the steady alarm indicator bit ALST, as hereinbefore described relative to step 442. Steps 458 and 442, and the "no" branch of step 456 proceed to step 444 and the return point 446.

A program similar to program 432 can be used to check the current draw of damper relay 164 and its associated circuitry, which includes damper solenoid 184. In such a current draw damper check, program step 436 would energize the damper relay, and if the resulting current draw exceeds a predetermined upper limit, step 442 would set an ALCH alarm DMPC (damper circuit current draw excessive) and it would set the steady alarm indicator bit ALST. Step 450 would set an ALLOG alarm DMPC, which indicates the current draw of the damper circuit is below the lower limit. Step 458 would set the ALCH alarm DMPC and steady alarm indicator bit ALST, similar to step 442, indicating excessive current in the damper circuit.

In like manner a program similar to program 432 can be used to check the current draw of the modulation valve 64 and its associated circuitry. In such a current draw check of modulation valve 64, program step 436 would provide an output which should close the modulation valve, and if the current draw exceeds a predetermined upper limit, step 442 would set an ALCH alarm MODC (modulation valve circuit current draw excessive) and it would set the steady alarm indicator bit ALST. Step 450 would set an ALLOG alarm MODC, which indicates the current draw of the modulation valve circuit is below the lower limit. Step 458 would set the ALCH alarm MODC and steady alarm indicator bit ALST, similar to step 442, indicating excessive current in the modulation valve circuit.

A program similar to program 432 may also be used to check the current draw of hot gas by-pass relay 166 and its associated circuitry which includes hot gas solenoid 188. In such a current draw check of the hot gas circuit, program step 436 would energize hot gas relay 166, and if the resulting current draw exceeds a predetermined upper limit, step 442 would set an ALCH alarm HGC (hot gas circuit current draw excessive) and it would set the steady alarm indicator bit ALST. Step 450 would set an ALLOG alarm HGC, which indicates the current draw of the hot gas circuit is below the lower limit. Step 458 would set the ALCH alarm HGC and steady alarm indicator bit ALST, similar to step 442, indicating excessive current in the hot gas circuit.

Figure 11A:
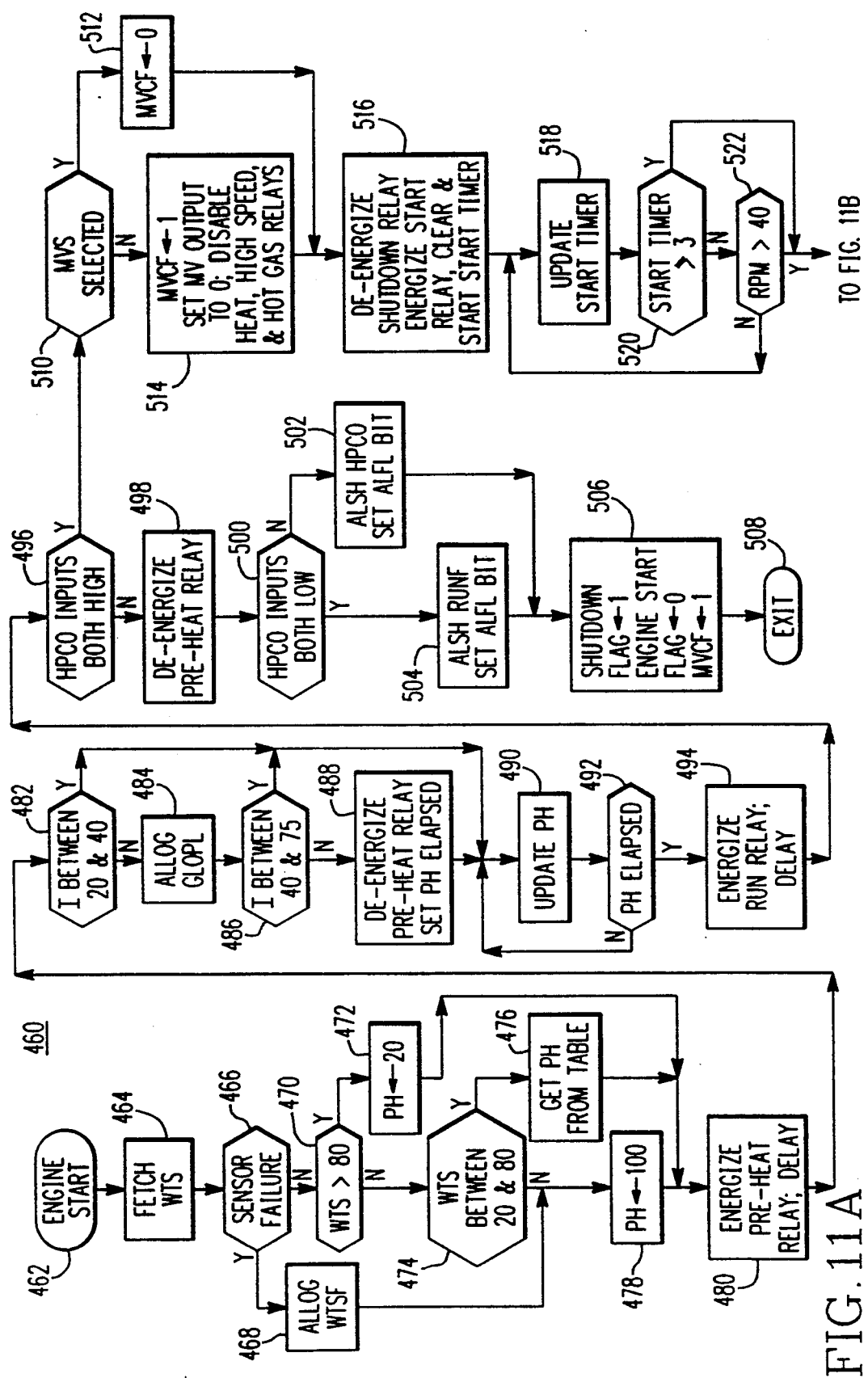
FIGS. 11A and 11B collectively set forth a flow diagram of an engine start program.
Figure 11B:
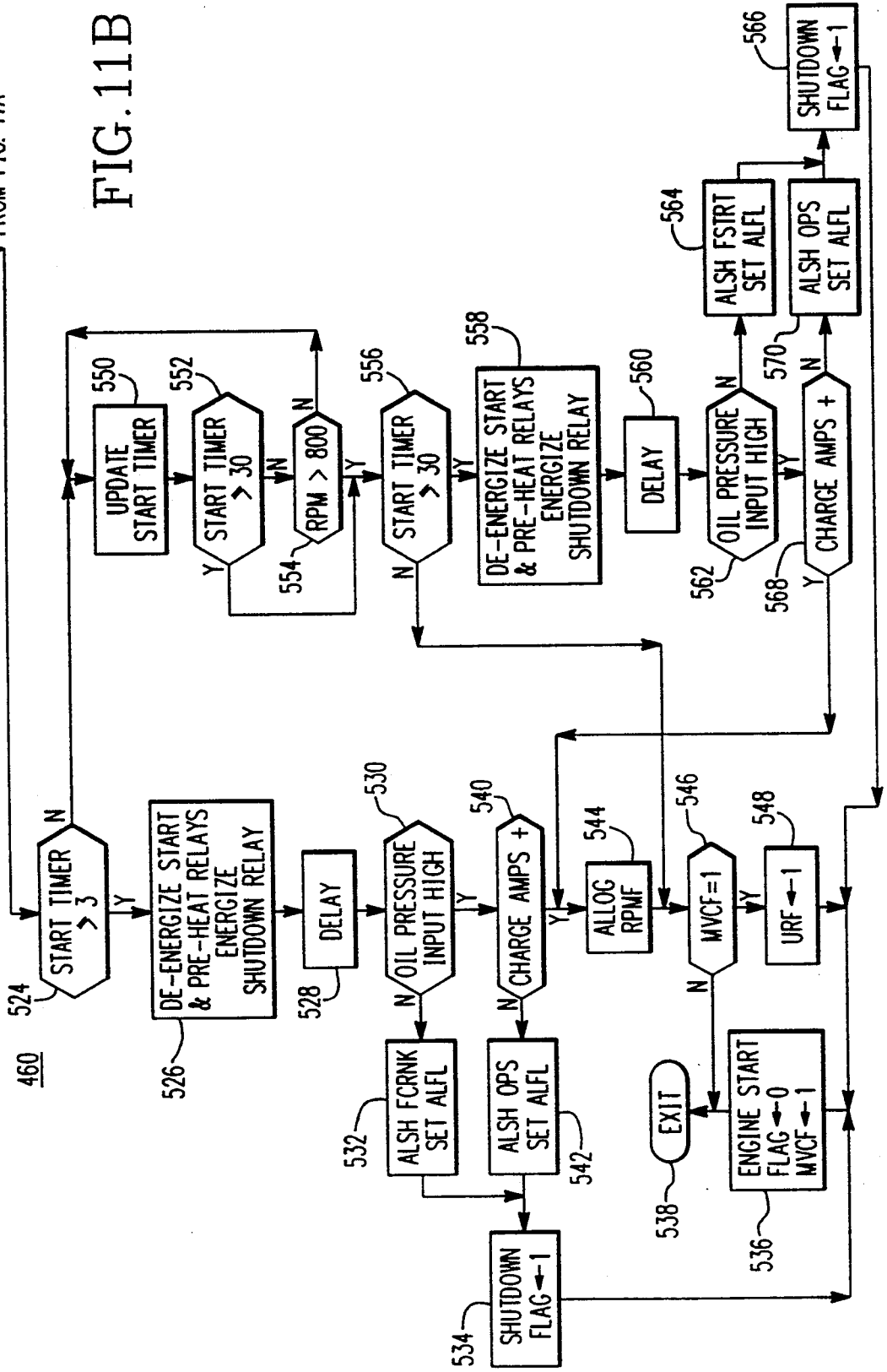

FIGS. 11A and 11B may be combined to provide a program 460 for starting engine 30, which is similar to the program of FIGS. 6A and 6B of incorporated application Ser. No. 728,665, except modified according to the teachings of the invention.

Program 460 in FIG. 11A is entered at 462 and a portion of the program devoted to determining engine pre-heat time is entered. Step 464 obtains the value of the water temperature sensor (WTS) 116 which provides an indication of the engine block temperature. Step 466 determines if the value is in a plausible range, and if not, step 468 sets an ALLOG alarm WTSF (failure of the water temperature sensor) and advances to step 478.

If sensor 116 is functional step 470 compares the temperature provided by sensor 116 with a predetermined value, e.g., 80 degrees F., to see if the engine is warm enough to start with a predetermined minimum pre-heat time, e.g., 20 seconds. If the temperature of engine 30 exceeds 80 degrees F., step 472 sets pre-heat time PH to the predetermined minimum value and the program advances to step 480.

If the engine block temperature does not exceed 80 degrees F., step 474 checks to see if it is in a range, e.g., 20 degrees F. to 80 degrees F., which provides pre-heat time PH from a look-up table stored in ROM 122. If the block temperature is in the predetermined range, step 476 gets pre-heat time PH from the look-up table. If the engine block temperature is below the lower limit of the range used in step 474, e.g., 20 degrees F., a maximum preheat time, e.g., 100 seconds is assigned in step 478. When the water temperature sensor 116 is found to be faulty, the maximum pre-heat time is also provided, as step 468 advanced to step 478.

Step 480 energizes pre-heat relay 152 which closes its contacts 153 to energize glow plug resistors 148 to start the engine pre-heat process. After a short delay selected to enable the current to stabilize, step 482 checks the voltage drop across DC shunt 130 to determine if the current draw is in a predetermined proper range, e.g., between 20 and 40 amperes. If the current draw is in the desired range, step 482 proceeds to step 490. If the current draw is outside the desired range, step 484 sets an ALLOG alarm GLOPL (glow plug current out of limits).

Step 484 goes to step 486 which determines if the current draw is in a range which can allow pre-heat to continue, such as between 40 and 75 amperes. If the current draw is in this range, pre-heat continues and the program goes to step 490. If the current draw is not in the range used in step 486, step 488 discontinues pre-heat by de-energizing pre-heat relay 152 and setting the preheat time PH elapsed. Step 488 then goes to step 490.

Step 490 updates the pre-heat time PH and step 492 determines if the pre-heat time PH has elapsed. Nothing further happens in program 460 until step 492 finds PH elapsed, and then step 494 energizes run relay 158. After a short delay selected to enable the run relay 158 to pick-up, step 496 checks the voltage level on both sides of the high pressure cut out switch (HPCO) 110 via conductors 200 and 202. If both inputs are not high, it indicates a serious problem and engine 30 should not be started. The program then goes into a diagnostics phase to determine the cause of the problem.

Step 498 de-energizes pre-heat relay 152 and step 500 checks to see if the HPCO inputs are both low. If they are not both low, then there is a high pressure problem in the refrigerant circuit. Step 502 generates an ALSH alarm HPCO (high refrigerant pressure), and step 502 sets the flashing alarm indicator bit ALFL.

If step 500 finds both HPCO inputs low, it indicates a lack of voltage on conductor 175, which should have been provided when run relay 158 was energized in step 494. Thus, step 504 sets an ALSH alarm RUNF (failure in the run relay circuit), and step 504 also sets the flashing alarm indicator bit ALFL.

Steps 502 and 504 both proceed to step 506 which sets the shutdown flag true, the engine start flag false, and it sets a flag MVCF true which indicates that the modulation valve 64 need not be closed as the engine will not be started. The program then exits at 508.

If step 496 finds both HPCO inputs high, i.e., normal, step 510 determines if a "modulation valve start" has been requested. A "modulation valve start" closes modulation valve 64 during engine start to reduce the load on engine 30. If the modulation valve start feature is selected, step 512 sets a flag MVCF false to indicate that the valve closing routine is required and that it has not been completed. If the modulation valve start feature has not been selected, step 514 sets flag MVCF true, so the valve closing program will not be run, it sets the modulation valve output such that there will be zero current in modulation valve 64, which fully opens modulation valve 64, and step 514 disables the heat, high speed and hot gas relays 160, to start engine 30 in a low speed cooling cycle.

Step 516 de-energizes shutdown relay 156 to put safety switch SSW into the circuit as a back-up against excessive cranking time, step 516 further energizes start relay 146 and it clears and starts a start timer, which may be a software timer in RAM 124. When start relay 146 is energized it closes its normally open contacts 147 to energize starter solenoid (SS) 142, and starter solenoid 142 closes its normally open contacts 143 to energize starter motor 140 directly from one side of battery 126.

The program then enters a first starting phase to determine which occurs first, engine RPM reaching a first predetermined value, such as 40 RPM, or the start time reaching a first predetermined value, such as 3 seconds. This function is performed by steps 520 and 522. When the program advances beyond this point, step 524 determines if the start timer reached 3 seconds or the engine RPM reached 40 RPM. If the start timer reached 3 seconds, engine 30 either failed to start or the RPM sensor 118 is faulty. Step 524 goes to step 526 which de-energizes pre-heat relay 152, de-energizes start relay 146, and energizes shutdown relay 156. The shutdown relay is energized to prevent protective switch SSW from shutting unit 20 down, as engine 30 may have started, as will now be determined by running some diagnostic steps.

Step 528 delays long enough for the engine oil pressure to build up, if it indeed did start, and step 530 checks the low oil pressure switch (LOPS) 192 via conductor 198 to see if it opened. If conductor 198 is not high, then the low oil pressure switch 192 did not open, and step 532 sets an ALSH alarm FCRNK (engine failed to crank). Step 534 sets the shutdown flag true, and step 36 sets the engine start flag false. Step 536 also sets the modulation valve complete flag MVCF true to indicate that the modulation valve start routine does not have to run. The program then exits at 538.

If step 530 finds conductor 198 has voltage, switch 192 either opened because of oil pressure or switch 92 is faulty. Step 540 determines if battery 126 is being charged. If the battery 126 is not being charged, alternator 138 is not being driven, indicating engine 30 did not start. Thus, the low oil pressure switch 192 is faulty and step 542 sets ALSH alarm OPS (low oil pressure switch faulty), and step 542 goes to the hereinbefore described step 534.

If step 540 finds battery 126 being charged, i.e., the current direction through DC shunt 130 is opposite to the discharging direction, then engine 30 started and RPM sensor 118 must be faulty. Accordingly, step 544 sets ALLOG alarm RPMF (RPM sensor failure). Step 546 checks to see if the modulation valve start routine has been completed, and if not, step 546 goes to exit 538. Upon finding the modulation valve complete flag MVCF true, step 546 goes to step 548 which sets a unit running flag URF true. Step 536 sets engine start flag false, as the engine will not be started regardless of which path step 536 was entered from. The modulation valve complete flag MVCF is set true in the event step 536 was not entered from the path which includes step 546.

If step 524 finds that the start timer did not reach 3 seconds, then engine 30 reached 40 RPM and step 550 updates the start timer. Steps 552 and 554 then start a second phase of the engine starting routine which determines which event occurs first, engine 30 reaching a second predetermined speed, e.g., 800 RPM, or the start timer reaching a second predetermined time value, e.g., 30 seconds. When step 556 is arrived at, one of these two events has occurred and step 556 determines which one. If the start timer did not reach 30 seconds, the engine started and step 556 goes to the hereinbefore described step 546.

If step 556 finds that the start timer reached 30 seconds, then engine 30 did not start or there is a faulty sensor, and program 460 enters a diagnostic phase. Step 558 de-energizes start relay 146, it de-energizes pre-heat relay 152, and it energizes shutdown relay 156, as hereinbefore described relative to step 526. After a delay 560 to give engine oil pressure a chance to build if engine 30 had started, step 562 checks to see if oil pressure input line 198 is high. If it is not high, step 564 sets ALSH alarm FSTRT, and it sets the alarm flashing bit ALFL. Alarm FSTRT is different than alarm FCRNK, with alarm FCRNK indicating the engine failed to crank. If the program reaches step 564 the engine did crank, but it did not start, and thus FSTRT means the engine cranked but failed to start. Step 564 goes to step 566 which sets the shutdown flag true, and step 566 goes to step 536, which was described previously.

If step 562 finds the oil pressure input line 198 high, step 568 checks the direction of current through DC shunt 130. If battery 126 is charging, engine 30 is running and step 568 goes to the hereinbefore described step 544 to set ALLOG alarm RPMF; to indicate a failure of RPM sensor 118. If step 568 finds battery 126 is not being charged, engine 30 is not running and step 570 sets ALSH alarm OPS and it sets the alarm flashing bit ALFL, as described relative to step 542, and the program goes to the hereinbefore described step 566.

When microprocessor 96 receives an alarm from a program or from an external device, such as run timer 119, which alarms are related to maintenance of unit 20 rather than to a fault in unit 20, the alarm is considered a fourth category alarm. Fourth category alarms are stored when they occur and they are displayed later in response to a predetermined occurrence. For example, they may be displayed when the third category alarms are displayed. Fourth category alarms, unlike third category alarms, cannot be cleared by the operator, in order to make sure that maintenance personnel are advised as to the generation of the alarm. A predetermined code is required to reset a fourth category alarm.

We claim:

1. A method of operating a transport refrigeration unit having electrical control which includes a display, comprising the steps of:
   detecting the occurrence of predetermined events in the transport refrigeration unit,
   classifying at least certain of the predetermined events into at least first, second and third categories of unit fault conditions,
   shutting the unit down when a first category fault condition occurs,
   flashing a visual alarm indicator when a first category fault condition occurs,
   identifying the nature of a first category fault condition at the time of occurrence,
   energizing a visual alarm indicator continuously when a second category fault condition occurs,
   identifying the nature of a second category fault condition at the time of occurrence,
   storing a third category fault condition at the time of occurrence, and
   displaying all stored third category fault conditions for a predetermined period of time in response to a predetermined event.

2. The method of claim 1 wherein a predetermined event which causes the displaying of stored third category fault conditions is the step of turning the unit on.

3. The method of claim 1 including the steps of:
   providing a fourth category for detected events which relate to maintenance of the unit,
   storing a fourth category event at the time of occurrence, and
   displaying all stored fourth category events for a predetermined period of time in response to the same predetermined event which caused the third category events to be displayed.

4. The method of claim 3 including the step of providing a code which must be entered to clear a stored fourth category event.

5. The method of claim 3 wherein a predetermined event which causes fourth category events to be displayed is the step of turning the unit on.

6. The method of claim 1 including the steps of:
   measuring the current draw of a predetermined electrical circuit of the transport refrigeration unit,
   comparing the measured current draw with predetermined upper and lower limits,
   providing an alarm in a predetermined one of the at least first, second and third categories when the measured current draw exceeds the predetermined upper limit, and
   providing an alarm in a different one of the at least first, second and third categories when the measured current draw is less than the predetermined lower limit.

7. The method of claim 1 including the steps of:
   energizing a predetermined circuit of the transport refrigeration unit,
   measuring the current draw of said energized predetermined circuit,
   comparing the measured current draw with predetermined upper and lower limits,
   providing an alarm in a predetermined one of the at least first, second and third categories when the measured current draw exceeds the predetermined upper limit,
   providing an alarm in a different one of the first, second and third categories when the measured current draw is less than the predetermined lower limit,
   de-energizing said predetermined circuit,
   measuring the current draw of said de-energized predetermined circuit,
   comparing the current draw of said de-energized predetermined circuit with the current draw thereof when energized,
   and providing an alarm in said predetermined one of the first, second and third categories when the current draw of the de-energized predetermined circuit exceeds the current draw thereof when energized.

* * * * *